July 6, 1948. C. W. COCHRAN 2,444,498
GOGGLE WITH DETACHABLE LENS
Filed April 11, 1945

INVENTOR.
Clarence W. Cochran
BY Donald L. Brown
Attorney

Patented July 6, 1948

2,444,498

UNITED STATES PATENT OFFICE 2,444,498

GOGGLE WITH DETACHABLE LENS

Clarence W. Cochran, Belmont, Mass., assignor to Polaroid Corporation, Cambridge, Mass., a corporation of Massachusetts Application April 11, 1945, Serial No. 587,758

10 Claims. (Cl. 88—41)

This invention relates to ophthalmic devices, and more particularly to a new and improved sun goggle or the like.

It is one object of the present invention to provide a sun goggle or similar ophthalmic device utilizing sheet plastic material as the lens and wherein said lens is readily removable and may be readily exchanged.

Another object is to provide such a goggle in the form of a bar element provided with hinged temple means for mounting it above the eyes of the wearer and provided also with means for readily attaching thereto or detaching therefrom a lens of sheet plastic material.

A further object is to provide such a goggle wherein nose pad means are removably secured to said lens and may be readily removed therefrom and transferred to another similar lens.

A still further object is to provide such a goggle wherein said bar element and said nose pad means both are molded from organic plastic material and which goggle is accordingly light in weight and inexpensive and simple to manufacture.

A still further object is to provide a goggle as outlined above wherein the upper edge of said lens engages a groove in said bar element and is locked therein by key elements coaxially mounted with the hinges of said temples and engaging complementary slots in said lens.

Additional objects and advantages will in part appear and in part be pointed out in the course of the following detailed description of one or more embodiments of the invention, which are given as nonlimiting examples, in connection with the accompanying drawings, in which.

Figure 1:
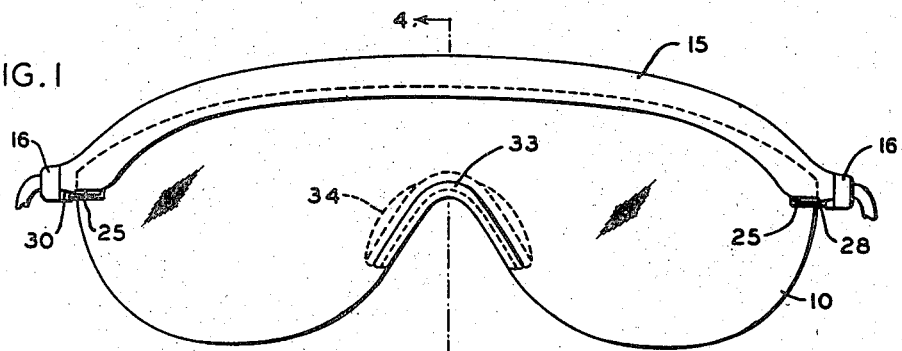
Figure 1 is a front view of a sun goggle embodying a form of the invention.

In the drawings, lens element 10 comprises an initially flat sheet of any suitable transparent plastic material having its upper edge 12 engaging in groove 14 in the under side of bar element 15. Lens sheet 10 preferably comprises selectively light-absorbing plastic material and particularly light-polarizing material such, for example, as any of the sheet polarizing materials sold under the trade name "Polaroid." If lens 10 comprises polarizing material, it may be arranged so that its transmission axis is substantially vertical, in which case it will serve to block glare resulting from light such as sunlight reflected from substantially horizontal surfaces, or at an angle of 45° to the vertical, in which case it will serve as an analyzer for use in a system of polarized automobile headlighting such as that shown in Patent No. 2,087,795. Alternatively, lens sheet 10 may comprise any other selectively light-absorbing material such, for example, as cellulose acetate having any desired light-absorbing dye incorporated therein. It will be understood that lens sheet 10 is preferably provided with substantially optically smooth surfaces.

Bar element 15 is preferably molded from a suitable organic plastic such for example as cellulose acetate and is curved both downwardly and rearwardly adjacent its ends in order to conform to the curvature of the head of the wearer of the device and to extend above his eyes. Bar 15 is also provided with any suitable temple means 16 hingedly connected thereto as by means of fork 18 carried by temple 16 and engaging rearwardly projecting lug 20 which may advantageously be made structurally integral with bar 15. Hinge pin 22 completes this assembly, but it is to be understood that the invention is not limited to this particular hinge construction and may utilize any of a variety of equivalent hinge means. Bar 15 is also shown as provided with a cut-out portion at 24 to decrease the weight thereof.

In accordance with the invention there is also provided means for releasably locking lens 10 to bar 15 after insertion in groove 14. Said locking means comprise a pair of key elements 25 pivotally mounted on bar 15 and each engaging a complementary slot 26 in the outer end of lens 10. Keys 25 are shown as secured to lugs 20 by hinge pins 22, and although this arrangement is not essential, it is convenient and eliminates a separate pivotal mounting. Keys 25 may be held in locked position by means of shoulders 28 at the outer ends of bar 15, which define seats for said keys in locked position. Keys 25 are preferably formed of a resilient material, such for example as spring steel, to permit them to be depressed from their locked position shown in Figs. 1 and 2 and swung out past shoulders 28 to the position shown at the left in Fig. 3. The return of keys 25 to locked position may be facilitated by providing shoulders 28 with bevelled lower surfaces 30, as will be noted particularly in Figs. 1 and 2, although this is not necessary and surfaces 30 may instead be squared.

Figure 2:
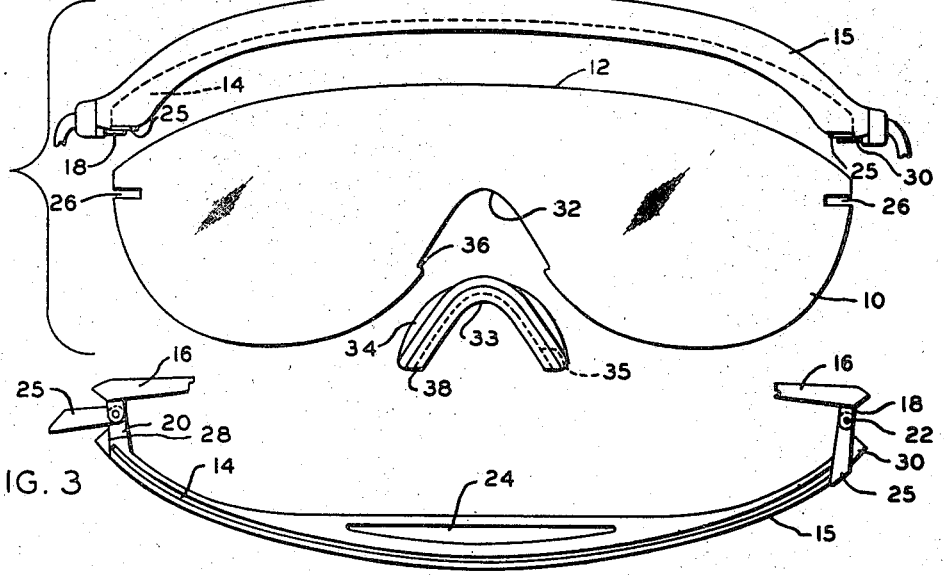
Figure 2 is an exploded front view of the goggle shown in Fig. 1.
Figure 3:
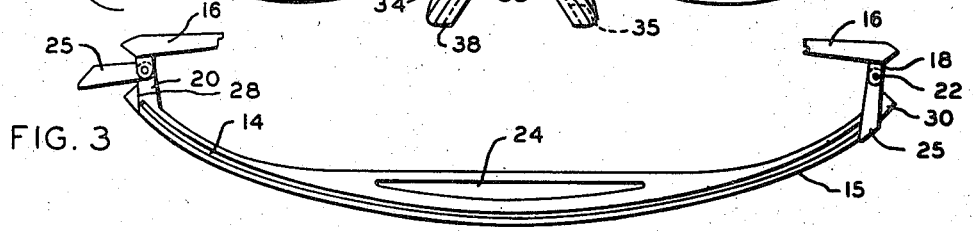
Figure 3 is a bottom view of the top bar element of the goggle shown in Figs. 1 and 2.

The process of changing lenses in the goggle of the invention is illustrated particularly in Figs. 1–3. The first step is to depress each of keys 25 from its locked position and swing it past its shoulder 28 to the open position shown at the left in Fig. 3. It will be noted that slots 26 are shown as of sufficient width to permit this vertical motion by keys 25 without motion of the lens itself. The lens is then withdrawn from groove 14, a new lens inserted therein, and keys 25 snapped back into locked position. In an alternative modification, slots 26 may be only sufficiently wide to receive keys 25, in which case the lens itself will also move downwardly with keys 25 when the latter are depressed for disengagement from or engagement with shoulders 28. In either case it is desirable that the top of slots 26 be spaced from the top edge of the lens by a distance equal to the depth of groove 14 at the ends thereof. This arrangement avoids putting strain on keys 25 while at the same time imparting rigidity to the structure in assembled condition.

Figure 4:
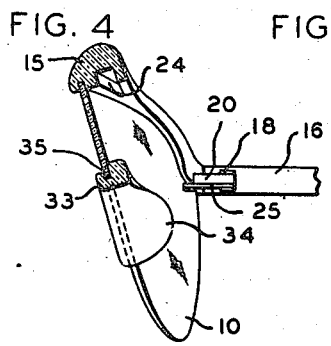
Figure 4 is a vertical section on line 4—4 in Fig. 1.
Figure 5:
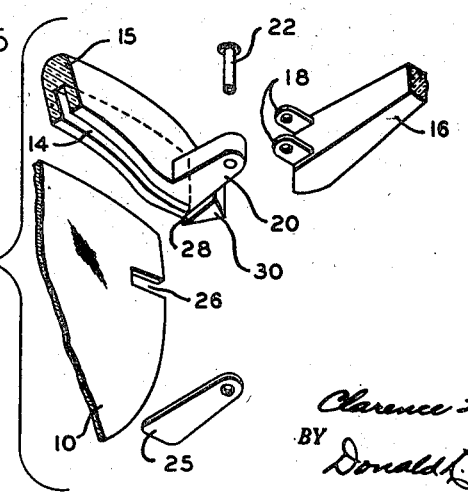
Figure 5 is an exploded partial perspective view illustrating a detail of the construction of the goggle shown in Figs. 1-4.

The above-described goggle may be used without any additional nose pad means if the sides of nose recess 32 are appropriately designed, but the invention also provides supplementary nose pad means which may be releasably secured to lens 10. As is shown particularly in Figs. 2 and 4, said means comprises a yoke element 33 provided with rearwardly extending nose-engaging pads 34. The outside of yoke element 33 is grooved at 35 to receive the edges of lens 10, as shown particularly in Fig. 4. Lens 10 may be notched adjacent the lower portion of nose recess 32 to provide a pair of shoulders 36 adapted to catch and hold the lower ends 38 of yoke 33. Preferably yoke 33 is made with ends 38 slightly farther apart than shoulders 36 and is formed of an organic plastic material such as cellulose acetate of sufficient resiliency to permit it to be compressed in order to be inserted into nose recess 32 and within shoulders 36. When it then expands, it is locked in place by both the engagement of the edges of lens 10 in groove 35 and the engagement of yoke ends 38 within shoulders 36.

Many advantages of the above-described description should be readily apparent. In particular it is possible by means of the construction of the present invention to utilize a variety of lenses of different optical properties with a single bar 15 and yoke 33 and to exchange lenses easily and rapidly. At the same time said construction is adequately rigid, and the component elements are firmly secured together during use. One readily apparent application for the invention is in conjunction with a pair of light-polarizing lenses, one for daytime use and one for night driving purposes. Many similar combinations of lenses will readily suggest themselves, and it is to be understood that the invention is not limited to the use of any particular material or materials in any of its component parts.

Since certain changes may be made in the above product and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

What is claimed is:

1. An ophthalmic device comprising, in combination, a bar element comprising organic plastic material and being adapted to extend across the face and above the eyes of the wearer of said device, temple means pivotally secured to the ends of said bar for holding said device in position on said wearer, lens means comprising a sheet of transparent organic plastic material shaped to provide a pair of eye portions having a nose recess therebetween, said bar element being provided with a longitudinal groove in the under side thereof, said lens engaging in said groove, and means for retaining said lens means within said groove, said last-named means being releasable to permit ready disengagement of said lens from said groove and bar element, said last-named means comprising a pair of key elements carried by said bar element, each of said key elements being pivotally mounted on said bar element coaxially with one of said temple pivotal means, means providing a complementary slot adjacent each end of said lens means, each of said keys being adapted to engage in one of said slots and thereby to retain said lens means within said groove in said bar element, and shoulder means adjacent each end of said bar element defining a seat adapted to receive one of said key elements when said key is engaging its complementary slot in said lens means and thereby to lock said key in said position, said key elements being of sufficiently resilient material to permit ready lifting thereof over said shoulder means for disengagement from said lens means.

2. An ophthalmic device comprising, in combination, a bar element adapted to extend across the face and above the eyes of the wearer of said device, temple means secured to the ends of said bar for holding said device in position on said wearer, lens means comprising a sheet of transparent organic plastic material shaped to provide a pair of eye portions having a nose recess therebetween, said bar element being provided with a longitudinal groove in the under side thereof, said lens engaging in said groove, means for retaining said lens means within said groove, said last-named means comprising key means pivotally secured to said bar element and means providing complementary slot means in said lens means, said key means being adapted to engage said slot means, and nose pad means comprising a yoke element adapted to rest on the nose of the wearer of said device, said yoke element being of substantially the same size and shape as said nose recess in said lens and fitting therewithin, the outside of said yoke element being provided with a groove for receiving the edge of said lens, said nose recess terminating in a pair of shoulders adapted to retain said yoke element within said recess.

3. An ophthalmic device comprising, in combination, a bar element comprising organic plastic material and being adapted to extend across the face and above the eyes of the wearer of said device, temple means pivotally secured to the ends of said bar for holding said device in position on said wearer, lens means comprising a sheet of transparent organic plastic material shaped to provide a pair of eye portions having a nose recess therebetween, said bar element being provided with a longitudinal groove in the under side thereof, said lens engaging in said groove, means for retaining said lens means within said groove, said last-named means being releasable to permit ready disengagement of said lens from said groove and bar element, said last-named means comprising a pair of key elements carried by said bar element and means providing a complementary slot adjacent each end of said lens means, each of said key elements being pivotally mounted on said bar element coaxially with one of said temple means and being adapted to engage in one of said slots and thereby to retain said lens means within said groove in said bar element, shoulder means adjacent each end of said bar element defining a seat adapted to receive one of said key elements when said key is engaging its complementary slot in said lens means and thereby to lock said key in said position, said key elements being of sufficiently resilient material to permit ready lifting thereof over said shoulder means for disengagement from said lens means, and nose pad means comprising a yoke element adapted to rest on the nose of the wearer of said device, said yoke element being of substantially the same size and shape as said nose recess in said lens and fitting therewithin, the outside of said yoke element being provided with a groove for receiving the edge of said lens, said nose recess terminating in a pair of shoulders adapted to retain said yoke element within said recess, said yoke element comprising relatively resilient organic plastic material, the lower ends of said yoke element being farther apart than said shoulders on said lens but being compressible towards each other for insertion in and removal from said nose recess.

4. An ophthalmic device comprising, in combination, a bar element comprising organic plastic material and being adapted to extend across the face and above the eyes of the wearer of said device, temple means pivotally secured to the ends of said bar for holding said device in position on said wearer, lens means comprising a sheet of transparent organic plastic material shaped to provide a pair of eye portions having a nose recess therebetween, said bar element being provided with a longitudinal groove in the under side thereof, said lens engaging in said groove, and means for retaining said lens means within said groove, said last-named means being releasable to permit ready disengagement of said lens from said groove and bar element, said last-named means comprising a pair of key elements carried by said bar element, each of said key elements being pivotally mounted on said bar element coaxially with one of said temple means, means providing a complementary slot adjacent each end of said lens means, each of said keys being adapted to engage in one of said slots and thereby to retain said lens means within said groove in said bar element, and shoulder means adjacent each end of said bar element defining a seat adapted to receive one of said key elements when said key is engaging its complementary slot in said lens means and thereby to lock said key in said position, said key element being of sufficiently resilient material to permit ready lifting thereof over said shoulder means for disengagement from said lens means, the width of each of said slots being substantially equal to the sum of the thickness of one of said key elements and the height of one of said shoulders, the top of each of said slots being substantially flush with the adjacent seat for its complementary key when said lens is fully engaged in said groove in said bar.

5. An ophthalmic device comprising, in combination, a substantially rigid, curved bar element adapted to extend horizontally across the forehead of the wearer of said device, means providing a groove extending longitudinally of said bar for receiving a sheet of lens material, temple means pivotally secured to the ends of said bar for holding said device in position on said wearer, lens means comprising a sheet of transparent plastic material adapted to releasable engagement with groove portions of said bar and shaped to provide a pair of eye portions having a nose recess therebetween, key means pivotally mounted at the ends of said bar for releasably locking said lens within said groove, means for releasably locking said key means in closed position, and means for releasably retaining a bridge comprising a nose pad in position within said nose recess.

6. An ophthalmic device comprising, in combination, a substantially rigid curved bar element adapted to extend horizontally across the forehead of the wearer of said device, means providing a groove extending longitudinally of said bar for receiving a single sheet of lens material, temple means pivotally secured to the ends of said bar for holding said device in position on said wearer, lens means comprising a sheet of transparent plastic material adapted to releasable engagement with groove portions of said bar and shaped to provide a pair of eye portions having a nose recess therebetween and a pair of slots which lie adjacent said bar when said lens is mounted in said groove, key means pivotally secured to said bar coaxially with said temple pivotal means and adapted to insertion and withdrawal relative to said slots for releasably locking said lens within the groove of said bar, resilient, yoke-like bridge means comprising a nose pad and having a groove extending longitudinally thereof, said groove being adapted to releasably engage nose recess portions of said lens, and means for releasably locking said bridge in position comprising a pair of shoulders formed in said lens and adapted to prevent displacement of said bridge when said nose recess portions are fully inserted in said groove thereof.

7. An ophthalmic device comprising, in combination, a substantially rigid bar element adapted to extend horizontally across the forehead of the wearer of said device, means providing a groove extending longitudinally of said bar for receiving upper peripheral portions of a sheet of lens material, temple means pivotally secured to the ends of said bar for holding said device in position on said wearer, lens means comprising a sheet of transparent plastic material having aforesaid portions adapted to releasable insertion within the groove of said bar, said lens being shaped to provide a pair of eye portions having a nose recess formed therebetween and a pair of slots extending inwardly from horizontal extremities thereof, said slots being adapted to positioning immediately below and adjacent the extremities of said bar when said lens is mounted in said groove, and means pivotally mounted upon the extremities of said bar for releasably locking said lens portions within the groove of said bar, said last-named means being adapted to insertion and withdrawal relative to said slots in the lens for, respectively, locking and releasing said lens with respect to said bar, the aforesaid relative constructions providing for releasably locking said lens portions within said groove to the maximum depth provided by said groove and, accordingly, providing a substantially rigid assembly of aforesaid elements.

8. An ophthalmic device comprising, in combination, a substantially rigid bar element, curved both downwardly and rearwardly from a center point thereon, and adapted to extend horizontally across the forehead of the wearer of said device, means providing a groove extending longitudinally of said bar for receiving upper peripheral portions of a sheet of lens material, temple means pivotally secured to the ends of said bar for holding said device in position on said wearer, lens means comprising a sheet of transparent plastic material having its upper peripheral portions adapted to releasable insertion within the groove of said bar, said lens being shaped to provide a pair of eye portions having a nose recess therebetween and a pair of slots extending inwardly from horizontal extremities thereof, said slots being adapted to positioning immediately below and adjacent the extremities of said bar when said lens is mounted in said groove, and means pivotally mounted upon the extremities of said bar for releasably locking said lens portions within the groove of said bar, said last-named means being adapted to insertion and withdrawal relative to said slots in the lens for, respectively, locking and releasing said lens with respect to said bar, the aforesaid relative constructions providing for releasably locking said lens portions within said groove to the maximum depth provided by said groove and, accordingly, providing a substantially rigid assembly of aforesaid elements.

9. An ophthalmic device comprising, in combination, a substantially rigid bar element adapted to extend horizontally across the forehead of the wearer of said device, said bar terminating in a pair of horizontal faces, means providing a groove extending longitudinally of said bar for receiving upper peripheral portions of a sheet of lens material, temple means pivotally secured to the ends of said bar for holding said device in position on said wearer, lens means comprising a sheet of transparent plastic material having its upper peripheral portions adapted to releasable insertion within the groove of said bar, said lens being shaped to provide a pair of eye portions having a nose recess formed therebetween and a pair of slots extending substantially horizontally inwardly from extremities thereof, said slots being adapted to positioning immediately below and adjacent said pair of horizontal faces of said bar when said lens is mounted in said groove whereby the upper edges of said slots and said faces are substantially flush, and key means pivotally mounted upon the extremities of said bar for releasably locking said lens portions within the groove of said bar, said key means being adapted to pivotal movement in a substantially horizontal plane for insertion and withdrawal relative to said slots in the lens for, respectively, locking and releasing said lens with respect to said bar, the aforesaid relative constructions providing for releasably locking said lens portions within said groove to the maximum depth provided by said groove and, accordingly, providing a substantially rigid assembly of aforesaid elements.

10. An ophthalmic device comprising, in combination, a substantially rigid bar element adapted to extend horizontally across the forehead of the wearer of said device, said bar terminating in a pair of horizontal faces, means providing a groove extending longitudinally of said bar for receiving upper peripheral portions of a sheet of lens material, temple means pivotally secured to the ends of said bar for holding said device in position on said wearer, lens means comprising a sheet of transparent plastic material having upper peripheral portions adapted to releasable insertion within the groove of said bar, said lens being shaped to provide a pair of eye portions having a nose recess formed therebetween and a pair of slots extending substantially horizontally inwardly from extremities thereof, said slots being adapted to positioning immediately below and adjacent said pair of horizontal faces of said bar when said lens is mounted in said groove whereby the upper edges of said slots and said faces are substantially flush, resilient key means pivotally mounted upon the extremities of said bar for releasably locking said lens portions within the groove of said bar, said key means being adapted to pivotal movement in a substantially horizontal plane for insertion and withdrawal relative to said slots in the lens for, respectively, locking and releasing said lens with respect to said bar, and shoulder means projecting downwardly from extremities of said bar adjacent each of said horizontal faces thereof, said shoulder means being adapted to lock said key means when positioned within said slots and in contact with said faces, said key means being adapted to deflection in a vertical plane for passing said shoulder means during aforesaid insertion and withdrawal of said key means.

CLARENCE W. COCHRAN.

REFERENCES CITED

The following references are of record in the file of this patent:

UNITED STATES PATENTS

| Number | Name | Date |
|---|---|---|
| 1,248,869 | Johnston | Dec. 4, 1917 |
| 1,290,420 | Uhlemann | Jan. 7, 1919 |
| 2,151,668 | Vitolo | Mar. 21, 1939 |
| 2,187,810 | Rentz | Jan. 23, 1940 |
| 2,311,991 | Nerney | Feb. 23, 1943 |
| 2,337,617 | Miller, Jr. | Dec. 28, 1943 |
| 2,345,065 | Nerney | Mar. 28, 1944 |
| 2,368,750 | Du Bois | Feb. 6, 1945 |